April 5, 1966   R. W. KETCHLEDGE   3,244,133
SIGNAL CONTROLLED STEERING SYSTEM
Filed July 17, 1943   2 Sheets-Sheet 1

INVENTOR
R. W. KETCHLEDGE
BY
Walter C. Kiesel
ATTORNEY

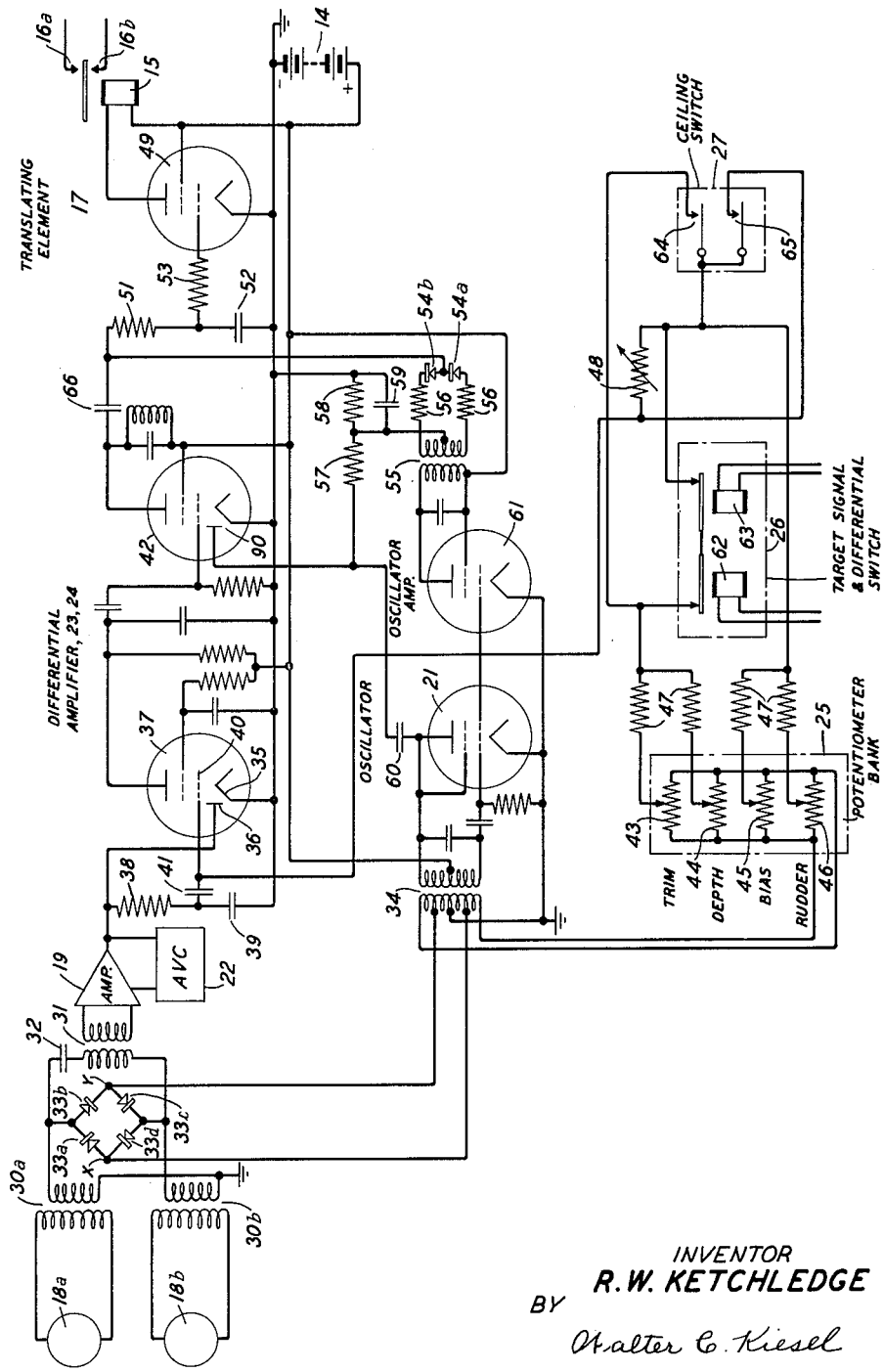

3,244,133
Patented Apr. 5, 1966

3,244,133
SIGNAL CONTROLLED STEERING SYSTEMS
Raymond W. Ketchledge, New York, N.Y., assignor to Bell Telephone Laboratories, Incorporated, New York, N.Y., a corporation of New York
Filed July 17, 1943, Ser. No. 495,116
10 Claims. (Cl. 114—23)

This invention relates to signal controlled steering systems for moving bodies and more particularly to systems of the type disclosed in the applications, Serial No. 491,797, filed June 22, 1943, of John C. Steinberg and Serial No. 491,794, filed June 22, 1943, now Patent No. 3,215,109, of Hugh K. Dunn for steering a torpedo toward a target, such as a submarine, in accordance with information derived from signals, such as propeller noise, emanating from the target.

In torpedo steering systems of the type disclosed in the aforementioned applications, the horizontal and vertical rudders are controlled in accordance with the resultant of certain direct current potentiometer control signals determined by such factors, for example, as the trim and depth of the torpedo, and the rudder position, and a target signal determined by the difference of the target signal levels at a pair of hydrophones mounted on the torpedo. As disclosed in the application of Hugh K. Dunn, the two hydrophones may be operatively associated on a shared time basis, as by way of a mechanical or electronic switching device, with a high frequency amplifier. The amplifier output is resolved into a direct current potential related in amplitude and polarity to the difference of the hydrophone outputs and this potential is combined with the direct current control signals. The resultant direct current signal is amplified and as amplified is utilized to control the direction of movement of a rudder deflecting device in accordance with the polarity of the resultant direct current signal.

One object of this invention is to improve the stability of signal controlled steering systems for moving bodies such as torpedoes.

Another object of this invention is to simplify such systems.

A further object of this invention is to increase the reliability of switching devices for operatively associating two translating elements, such as hydrophones, with a third element, such as an amplifier, on prescribed time basis.

Still another object of this invention is to improve potentiometer control circuits in a signal controlled steering system and more particularly to expedite automatic connection and disconnection of elements in the control circuits in accordance with a variety of operating conditions of the steering system.

In one illustrative embodiment of this invention, a steering system for a torpedo comprises a pair of hydrophones especially sensitive to a prescribed frequency, which may be supersonic, an amplifier tuned to the prescribed frequency, a switching element for connecting the two hydrophones operatively to the input of the amplifier in alternation at a second prescribed frequency, advantageously considerably lower than the first frequency, a potentiometer bank for producing a potentiometer control signal, and means for resolving the combined hydrophone signals and the potentiometer signal into a control signal the polarity and amplitude of which are determined by the sum of the potentiometer signal and the difference of the hydrophone signals. The control signal is utilized to cause deflection of a rudder in one or the other direction in accordance with the polarity of the control signal.

In accordance with one feature of this invention, the potentiometer bank is energized by an alternating current of the switching frequency, the output of the amplifier is rectified to produce a direct current target difference signal having a component of switching frequency and corresponding to the difference in the hydrophone signals and the target difference and potentiometer signals are combined in such relation and amplified by a second alternating current amplifier to produce an alternating current signal of switching frequency related in phase and amplitude to the sum of the target difference and potentiometer signals. This resultant signal is then rectified on a time basis related to the switching frequency, whereby a direct current control signal corresponding in polarity to the sum of the target difference and potentiometer signals is obtained.

In accordance with another feature of this invention, the switching of the hydrophones in alternation to the first amplifier is effected by a rectifier bridge and oscillator arrangement operative to effectively short-circuit the hydrophones alternately, at the oscillator frequency, with respect to the input of the first amplifier.

In accordance with still another feature of this invention, the rectification of the resultant of the target difference and potentiometer signals is attained by a rectifier element energized by the oscillator in phase with the operation of the switching element associated with the hydrophones and first amplifier.

In accordance with a further feature of this invention, means are provided for disconnecting the trim and depth controls whenever the target difference signal is of at least a prescribed intensity.

In accordance with a still further feature of this invention, means dependent in operation upon the relative magnitudes of several impedances are provided for rendering the target signal ineffective to steer the torpedo whenever the torpedo is at or rises to or above a prescribed depth of submersion.

The invention and the above-noted other features thereof will be understood more clearly and fully from the following detailed description with reference to the accompanying drawing in which:

FIG. 3 is a detailed circuit diagram of a system of the configuration illustrated in FIG. 1.

Figure 1:
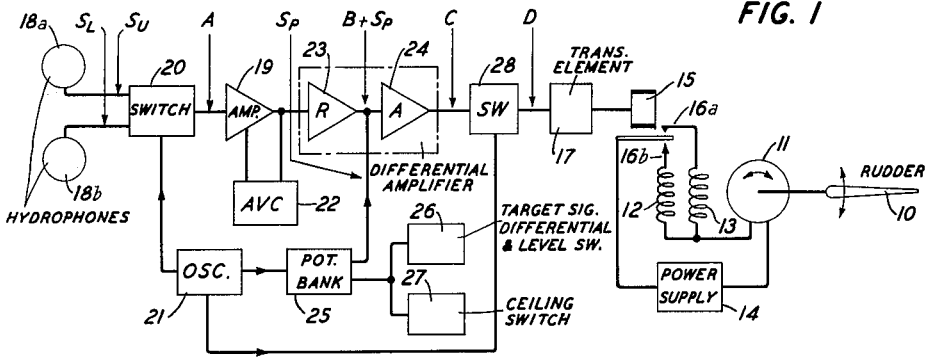
FIG. 1 is a block diagram of a signal controlled steering system for a torpedo, illustrative of one embodiment of this invention.

Referring now to the drawing, the steering system illustrated in FIG. 1 is adapted for control of the horizontal rudder or elevator of a torpedo in accordance with signals emanating from a body such as a submarine. The same system with certain modifications pointed out hereinafter is suitable also for the control of the vertical rudder of a torpedo in accordance with such signals. It will be understood, of course, that in a torpedo two systems, one for control of the horizontal rudder or elevator and the other for control of the vertical rudder, may be employed to steer the torpedo toward and against a submerged body, such as a submarine.

The system illustrated in FIG. 1 comprises a rudder 10 coupled to a reversible motor 11 having field windings 12 and 13, the direction of rotation of the motor and, hence, the direction of deflection of the rudder, being determined by which of the field windings is energized. The motor is energized by a power supply source 14, such as a battery, one terminal of which is connected to either of the windings 12 or 13 in accordance with the operation of a differential relay 15. The relay 15 operates to close one or the other of its contacts 16a or 16b in accordance with the polarity of a control signal applied to the input of a direct current translating element 17.

The control signal, as described in detail hereinafter, is the resultant of several signals, the amplitude and polarity or phase relation of which signals at any instant are determined by the bearing of the sound source or target with respect to the torpedo and the rudder position or by the course, depth and trim of the torpedo.

Mounted upon the top and bottom of the torpedo, as in the manner disclosed in the above-identified application of John C. Steinberg, are a pair of hydrophones 18a and 18b. For example, the hydrophones may be of the piezoelectric type of the construction disclosed in the application of J. C. Steinberg and substantially non-directional about the axis of alignment thereof, whereby the relative response of the two hydrophones to signals emanating from the source or target is a measure of or proportional to the direction of the source or target with respect to the longitudinal axis of the torpedo. Advantageously, the hydrophones are tuned to a prescribed frequency, for example of the order of 24 kilocycles per second.

The two hydrophones are operatively connected to the input of a high frequency amplifier 19 in alternation and at a predetermined frequency by a switch 20 energized from an oscillator 21. The switching frequency is lower than the frequency to which the hydrophones are tuned. Advantageously, the switching frequency is such that at least several cycles of the target signal frequency, i.e., the frequency to which the hydrophones 18 are tuned, are supplied to the amplifier 19 during each period of the connection of each hydrophone to the amplifier. In a particular system, a switching frequency of 200 cycles per second, with a target signal frequency of 24 kilocycles per second, has been found satisfactory and advantageous although it will be understood that a lower switching frequency, or a higher switching frequency, preferably not greater than one-half the target signal frequency, may be utilized. The amplifier 19 is provided with automatic volume control 22 which reduces the amplifier gain substantially in proportion to the average of the two hydrophone signals whereby a substantially constant level for the amplifier output independent of the absolute signal levels at the hydrophones throughout a wide range of signal levels is established. Thus it will be seen that in the output of the amplifier 19 the signals from the two hydrophones are combined on a relative rather than an absolute amplitude basis and a signal can be obtained proportional to the difference of the two hydrophone signals.

The output of the amplifier 19 is supplied to a rectifier 23 and the rectified signal, which is of switching frequency and proportional to the difference of the hydrophone signals, is supplied to the input grid of an amplifier 24, the output of which is tuned to the switching frequency. Advantageously, the amplifier 24 is operated so that it is always overloaded. A potentiometer signal, which is the resultant of several controls such as trim, depth and rudder follow up, of the switching frequency is obtained from a potentiometer bank 25 energized by the oscillator 21 and is applied to the input grid of the amplifier 24. As pointed out in detail hereinafter, certain of the potentiometer controls and also controls in accordance with the hydrophone signals may be interrupted under particular operating conditions by, respectively, a target signal differential and level switch 26 and a ceiling switch 27. The output of the amplifier 24 comprises two components of switching frequency which are either in phase or 180 degrees out of phase, one component corresponding to the difference of the hydrophone or target signals and the other corresponding to the potentiometer signal. The resultant signal is applied to a switch 28 energized in phase with the switch 20 by the oscillator 21, the switch operation being such that the signal obtained from the amplifier 24 is resolved into a direct current signal the polarity and magnitude of which are determined by the polarity and magnitude respectively of the sum of the target difference signal and the potentiometer signal applied to the input grid of the amplifier 24. The direct current signal is applied to the translating element 17 to control operation of the differential relay 15 in accordance with the polarity of the direct current signal.

Figure 2A:
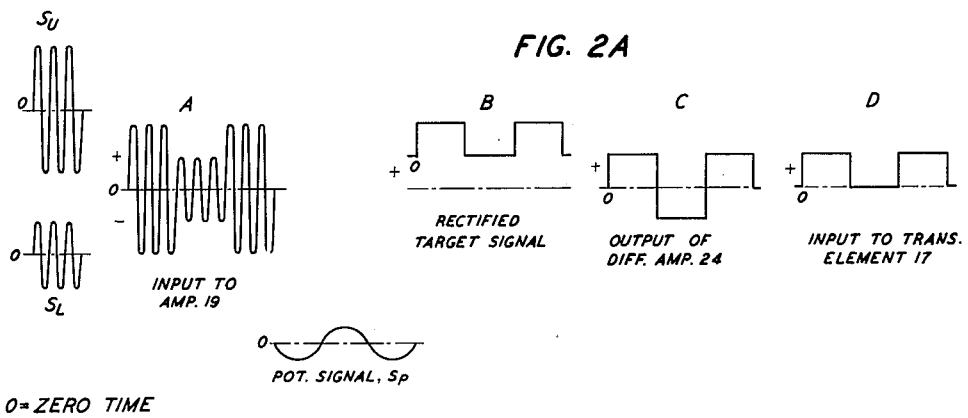
FIGS. 2A and 2B are diagrams illustrating typical forms of the signals at various points in the steering system shown in FIG. 1, for two conditions of target and potentiometer signals.
Figure 2B:
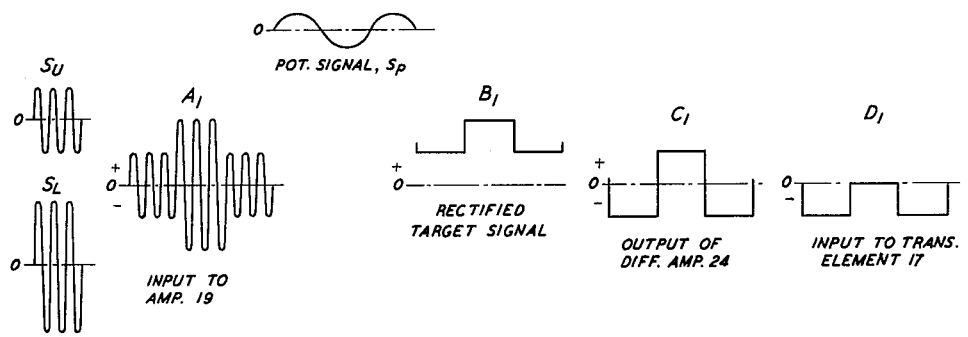

The general operation of the system will be understood more clearly with reference to FIGS. 2A and 2B, the former illustrating the operation when the target signal, $S_u$, at the upper hydrophone 18a is greater than the target signal, $S_l$, at the lower hydrophone 18b and the potentiometer signal, $S_p$, is out of phase with the difference target signal $S_l$ is greater than the signal $S_u$ and the signal $S_p$ is out of phase with the difference signal. For convenience of illustration, the target signals are considered as substantially sinusoidal although it will be understood that if the target is a submarine and the signals are those emanating from the propeller of the submarine, the target signal will be largely noise and, hence, of complex character. However, the operation of the system is essentially the same for both sinusoidal and noise or complex target signals. For simplicity and convenience of illustration also, certain of the signal wave forms in FIGS. 2A and 2B have been idealized although in all cases the wave forms shown are essentially the equivalent of the actual waves obtained with either sinusoidal or complex target signals.

Referring now first to FIG. 2A, signals emanating from the target, e.g. submarine, for example 24 kilocycle signals, are received by the hydrophones 18. It is assumed that the torpedo is at a depth greater than the depth of the submarine so that, as noted before, the upper hydrophone signal $S_u$ is greater than the lower hydrophone signal $S_l$. The two hydrophone signals are in phase.

The hydrophones are connected alternately to the amplifier 19 at a frequency of 200 cycles so that the input signal to the amplifier is of the form shown at A, i.e., a 200 cycle signal of alternate components of equal period, one component corresponding to $S_u$ and the other to $S_l$. The output signal of the amplifier 19 is of the same form. This signal is applied to the rectifier 23 to produce a signal of the form shown at B, i.e., a substantially square top half wave of 200 cycle frequency, the rectified signal applied to the input grid of the amplifier 24. Also applied to the grid is a sinusoidal potentiometer signal $S_p$, which is shown as out of phase with and of smaller amplitude than the rectified target signal. As pointed out hereinafter, the signal $S_p$ may be in phase with or of greater amplitude than the rectified target signal. The amplifier 24, which as noted heretofore advantageously is operated at overload condition, amplifies the combined rectified target signal and the potentiometer signal to produce a substantially square top 200 cycle alternating signal as shown at C. The polarity and amplitude of this signal, it will be apparent, are determined by the polarity and amplitude of the sum of the potentiometer and target difference signals. The differential amplifier output is supplied to the switch 28 which operates as a time rather than a polarity controlled rectifier so that there is produced, as shown at D, a rectified signal corresponding in polarity to the resultant of the target difference and potentiometer signals. For the conditions postulated, the signal shown at D may be of positive polarity. This signal, as translated by the direct current translating element 17, causes operation of the relay to close the contact 16a with resultant operation of the motor 11 to deflect the rudder in the direction to steer the torpedo upwardly toward the target.

If the torpedo is traveling at a depth less than that of the target or submarine, the signal $S_u$ will be less than the signal $S_l$, as illustrated in FIG. 2B. The two 24 kilocycle target signals are switched at 200 cycles to the input of the amplifier 19 so that the amplifier input signal and also the output are of the form shown at $A_1$ in FIG. 2B. It will be noted that the signal at $A_1$ in FIG. 2B represents a phase reversal of the signal at A in FIG. 2A. The signal at $A_1$ is rectified at the rectifier 23 to produce a signal of the form shown at $B_1$, which is combined with the potentiometer signal $S_p$. The latter is illustrated as out of phase with and of lesser amplitude than the target signal although it will be understood that it may be in phase with or of greater amplitude than the target signal. The two signals supplied to the input grid of the amplifier 24 are amplified and resolved into a 200 cycle signal of the form shown at $C_1$, which it will be noted represents a phase reversal of the signal shown at C. By operation of the switch 28, the signal at $C_1$ is rectified on a time bases to produce a control signal, of negative polarity, as shown at $D_1$. The control signal as translated by the element 17 causes operation of the relay 15 to close the contact 16b whereby the motor is energized to deflect the rudder 10 in the direction to steer the torpedo downwardly toward the target.

As pointed out in detail hereinafter, in both the cases illustrated in FIGS. 2A and 2B, means may be provided for introducing into the potentiometer bank a signal of 200 cycle frequency proportional in amplitude to the rudder deflection and of such phase or relative polarity as to be in opposition to the target difference signal. Thus proportional control of the rudder deflection is obtained, that is rudder deflection dependent upon the bearing of the target with respect to the torpedo. When, by operation of the rudder, the torpedo is brought on course directly toward the target, the potentiometer signal counterbalances the target difference signal and the rudder motion ceases. In actual operation, some hunting of the rudder about its zero or on-course position occurs but the degree of rudder hunting deflection is slight and negligible for practical purposes.

The system may be operated in essentially the same manner as described with reference to FIGS. 2A and 2B to effect lateral steering of the torpedo, i.e. either to port or starboard thereof, to steer the torpedo toward the target.

One specific embodiment of the system illustrated in FIG. 1 is shown in FIG. 3. The hydrophones 18a and 18b are coupled to the respective primary windings of transformers 30a and 30b which step down the hydrophone impedances to a value suitable for switching. Advantageously, the primary windings noted are designed to resonate with the hydrophones at the natural frequency, e.g. 24 kilocycles per second, thereof. One side of each of the secondary windings of the transformer 30 is connected to ground as shown and the other sides are connected by way of the primary winding of a step-up transformer 31 and a condenser 32. Connected across the ungrounded sides of the windings 30 is a bridge of four rectifiers 33, for example of the dry disc type, poled as shown, the bridge being supplied with an alternating potential, e.g. of 200 cycles, applied across the other diagonally opposite corners $x$ and $y$ thereof. The switching potential is derived from a vacuum tube oscillator 21, as by way of taps equally spaced on opposite sides of the grounded mid-point of the secondary winding of a transformer 34. As will be apparent, the rectifiers 33 become conductive in pairs, that is on one-half cycle of the switching potential applied between the points $x$ and $y$, the rectifiers 33a and 33b are conductive and on the other half cycle the rectifiers 33c and 33d are conductive. On one-half cycle, e.g. when the rectifiers 33a and 33b are conductive, the secondary winding of transformer 30a is effectively short-circuited to ground by way of the rectifier 33b; on the other half cycle, the secondary winding of transformer 30b is effectively short-circuited to ground by way of the rectifier 33c. Thus, the hydrophones 18 are operatively associated atlernately with the amplifier on a shared time basis, each hydrophone being connected to the amplifier for one-half of each cycle of the switching frequency. The switching frequency ripple is filtered out by the condenser 32.

The output signal voltage of the amplifier 19, which, as noted heretofore, is of substantially constant level due to the automatic volume control 22, is applied across the diode rectifier element 35, 36 of the first tube 37 of the differential amplifier, tuned to the switching frequency, by way of a resistance 38 and condenser 39. The alternating component of the rectified signal, which is of the switching frequency, e.g., 200 cycles, is supplied to the control grid 40 of the tube 37 by way of the condenser 41. The first stage of the differential amplifier is resistance coupled to the second stage tube 42, and the plate circuit of the tube 42 is tuned to the switching frequency to increase the output voltage and gain.

Also applied to the control grid 40 of the tube 37 is a switching frequency, e.g., 200 cycle signal obtained from the potentiometer bank 25. The potentiometer bank 25 comprises a plurality of potentiometer elements 43, 44, 45 and 46 energized in parallel from the transformer 34. The potentiometer elements in general construction and function are similar to those disclosed in the aforementioned application of Hugh K. Dunn. Briefly, the contact arm of the element 43 is actuated, as by a pendulum, to tend to maintain the torpedo trim in the absence of target signal control, the contact arm being in center position when the torpedo is level; the contact arm of the element 44 is actuated by a hydrostatic bellows (not shown) to maintain the torpedo traveling at a presented depth in the absence of target signal control, the center position of the contact arm corresponding to the prescribed depth; the resistance 45 is employed for adjusting the bias applied to the control grid 40; and the contact arm of the element 46 is coupled to the rudder 10, the center position of the arm corresponding to the zero or center position of the rudder.

Suitable resistances 47 are connected in series with each of the potentiometer element contact arms and serve to fix the relative sensitivities of the several controls effected by these elements. The bias and rudder potentiometer elements are connected to the control grid 40 through a resistance 48 and the trim and depth potentiometer elements are similarly connected to the grid through the resistance 48 by way of a target signal level and differential switch 26, the operation of which will be described hereinafter. When any of the potentiometer element contact arms moves to either side of its center position there is produced a component of potentiometer signal, the amplitude of which is proportional to the magnitude of the arm movement and the phase or polarity of which with respect to the target signal applied to the grid 40 is determined by the direction of the displacement of the arm from its center position. The potentiometer signal at any instant is, of course, the resultant of the several component signals.

As pointed out heretofore, the output of the differential amplifier is a signal of switching frequency, e.g. 200 cycles, the amplitude and polarity of which are determined by the sum of the potentiometer signal and the target difference signal. The anode of the tube 42 is connected to the grid circuit of the tube 49 by way of a resistance 51 and condenser 52 and a second resistance 53. Connected to the output circuit of the tube 42 is a switching element which rectifies the output on a time basis. Specifically, the anode of the device 42 is connected to a point between a pair of rectifiers 54a and 54b, for example of the dry disc type, which are poled as shown and connected across the secondary winding of a transformer 55 through suitable current limiting resistors 56. The mid-point of the secondary winding is connected to the common terminal of a pair of resistances 57 and 58 the resistance 58 having a condenser 59 in parallel therewith and having one end thereof connected to ground. The resistance 57 is connected to the diode rectifier element 90 of the tube 42 as shown. One side of the resistance-condenser combination 58, 59 is connected to the anode of the oscillator by way of a condenser 60.

The transformer 55 is energized by an oscillator amplifier 61, the control grid of which is tied directly to the control grid of the oscillator 21 and, hence, driven in accordance with the potential appearing upon the latter grid. Alternatively, the transformer 55 may be energized by the oscillator 21 and the oscillator amplifier 61 may be omitted. The choice between use of the oscillator 21 alone or in combination with the oscillator amplifier 61 is determined in the main by the power requirements of the system although, as will be appreciated, the use of the combination simplifies the design requirements for the oscillator 21.

The rectifier elements 54, it will be apparent, are energized in phase with the switch 20 and at the same frequency. On one-half of the cycle, these elements are conductive so that the plate of the tube 42 is effectively short-circuited to ground, the circuit being traced from the plate, through condenser 66, thence to the common point of the elements 54, through elements 54a and 54b, through the secondary winding of the transformer 55, and from the mid-point of the secondary windings of the transformer 55 to ground by way of the resistance 58. Thus, as pointed out heretofore in connection with FIGS. 2A and 2B, the output of the amplifier 23, 24 is rectified on a time basis and resolved into a signal the polarity of which is determined by the sum of the potentiometer signal and the target difference signal. The output circuit of the tube 49 includes the winding of the relay 15 and, as is apparent, the relay 15 operates to close either of its contacts 16a and 16b in accordance with the polarity of the signal applied to the grid of the tube 49.

The resistance 51 and condenser 52 associated with the control grid of the tube 49 constitute a filter effective to smooth out the control signal applied to the grid. The constants of these impedances advantageously are correlated to produce a low time constant for the combination whereby substantially negligible delay in the operation of the relay 15 is realized.

It will be noted that the control grid of the tube 49 is biased in accordance with the potential drop across the resistance 58, the condenser 59 serving to smooth out the 200 cycle component in the drop so that the bias potential is substantially constant. Because of the diode element of the tube 42, the polarity of the bias potential applied to the control grid of the tube 49 is fixed. Inasmuch as the diode element noted is energized by way of the anode of the oscillator 21, the magnitude of the bias potential applied to the grid of the tube 49 will be determined by the direct current potential appplied to the oscillator anode from the source 14 which, as shown in the drawings, also supplies the anode of the tube 49. If the potential of the source 14 should vary, e.g., decrease, the bias applied to the control grid of the tube 49 would vary proportionately and in like manner. Thus, variations in the anode supply voltage for the tube 49 are compensated for and no appreciable drift in the operation of the tube 49 occurs over a wide range of anode voltages.

In some systems, the tube 49 may be omitted and the rectified output signal of the differential amplifier, suitably filtered, may be applied directly to the relay 15 to control the operation thereof.

It is advantageous in the use of the system for steering a torpedo that the trim and depth controls be rendered ineffective whenever the torpedo comes within a prescribed distance of the target so that thenceforth the torpedo is steered to the target in accordance with the target signals alone. This may be realized by disconnecting the trim and depth control elements whenever the target signal received by the hydrophones reaches a prescribed level or the target difference signal reaches a prescribed level. Specifically, a pair of relays 62 and 63 having their contacts normally closed and in series with the common connection between the trim and depth control elements 43 and 44 may be provided. The relay 62 is energized in accordance with the target signal level, its winding being connected to a point in the circuit, for example at the automatic volume control 22 or at the input to the amplifier 19, where the signal is proportional to the target signal level. The relay 63 is energized in accordance with the level of the target difference signal, its winding being connected to a point in the circuit, for example at the diode rectifier 35, 36, where the signal is proportional to the target difference signal. When either relay 62 or 63 operates, its contact is opened and the trim and depth control elements are disconnected from the potentiometer control circuit.

In some cases, it is desirable that the torpedo be prevented from rising above a prescribed depth. For example, in some cases reflections of the target signals from the sea surface may be such as to produce a false target signal, that is, for example, if the torpedo is traveling at a depth less than that of the target, the sum of the signals received by the upper hydrophone directly from the target and from the sea surface due to reflections may be greater than the signals received by the lower hydrophone and false steering of the torpedo would result. The torpedo may be prevented from rising above a prescribed depth by rendering the target signal control ineffective whenever the torpedo rises to or above this depth. To this end there is provided a ceiling switch 27 having normally open contacts 64 and 65 and associated armatures which are actuated, as by a hydraulic bellows operable in accordance with the depth of the torpedo, to close the contacts whenever the torpedo reaches or attempts to rise above the prescribed depth. As shown in FIG. 3, the armatures of the ceiling switch are connected together to one end of the resistance 48, the contact 64 is connected to the contact arms of the trim and depth control potentiometer elements 43 and 44 and the contact 65 is connected to the other end of the resistance 48.

For reasons which will appear presently, the sensitivity adjusting resistances 47 are made relatively small in comparison with the resistance 48 and the input condenser 41 associated with the grid 40 of the device 37 is made such that its reactance at the switching frequency is large in comparison to the resistances 47. For example, each of the resistances 47 may be of the order of 50,000 ohms, the resistance 48 may be of the order of 3 megohms and the condenser 41 may be of the order of 250 micromicrofarads having a reactance of the order of 3 megohms at 200 cycles.

The operation of the ceiling switch will be understood from the following considerations. Assume that the torpedo is traveling at a depth below that at which the ceiling switch operates to close its contacts and that the target signal level or target difference signal level is such that the relays 62 and 63 have operated. The torpedo, then, is under control of the target signal and the potentiometer signal due to the rudder follow up potentiometer 46. If, due to reflections from the sea surface or other causes, the torpedo rises to the prescribed depth, the ceiling switch 27 operates to close the contacts 64 and 65. Closing of the latter contact short-circuits the resistance 48 and closing of the contact 64 connects the trim and depth control potentiometer elements in circuit to the grid 40. The target difference signal is then being applied to the grid 41 by way of the relatively high impedance, e.g., 3 megohms, of the condenser 41 whereas the trim and depth control signals are applied to the grid 41 through a relatively low resistance, i.e., the associated resistances 47 in parallel. Consequently, the potentiometer and target difference signals being of comparable magnitude, the potentiometer component of the signal upon the grid 41 is very great in comparison to the target component of the signal applied to the grid so that, for practical purposes the target signal control is overcome and the torpedo is placed under control of the potentiometer signal. Thus, the torpedo is steered downwardly and, when it reaches a depth below that prescribed for operation of the ceiling switch 27 to close its contacts, the switch 27 operates to open its contacts, the trim and depth controls are disconnected and the torpedo is placed under control of the target signal.

As the torpedo travels into proximity to the target, the possibilities of false operation due to surface reflections of the target signals become increasingly less and the torpedo is guided to the target under target signal and rudder follow up control.

The resistance 48, it will be apparent, determines the relative sensitivities of the target signal and potentiometer signal controls and may be adjusted to provide a desired relation of these sensitivities.

The system has been described in detail as operated to control the horizontal rudder or elevator of the torpedo. It is adapted also for control of the vertical rudder of the torpedo. In a vertical rudder control system, the ceiling switch and the depth and trim controls are omitted. The relays 62 and 63 also may be omitted or may be utilized to control horizontal steering of the torpedo along a predetermined course whenever the target signal or target difference signal is below a prescribed level. For example, a switch may be provided in the potentiometer circuit to produce a potentiometer signal of such polarity that the vertical rudder is operated to steer the torpedo along a circular course whenever the target signal or target difference signal is below a prescribed level. When either or both signals reach the prescribed level, the relays 62 or 63 or both operate to open their contacts, the circling control is disconnected and the vertical rudder is thus placed under control of the target signal and the vertical rudder follow up potentiometer.

It is to be noted especially that the target and potentiometer signals are both alternating current signals and are amplified as such up to the point where a direct current control signal is obtained. Thus, difficulties such as are associated with direct current amplifiers, are avoided and stable operation and sensitivity are obtained. No great amount of amplification is necessary at the translating element 17, which, as noted heretofore, may be omitted. If the translating element is employed, the bias control of the grid thereof in the manner heretofore described assures compensation for variations in the potential of the supply source so that drift in the operation of the device 17 is substantially prevented.

It will be noted also that in the system illustrated in FIG. 3 all of the tubes are supplied from a single source 14. The cathodes of the tubes may be of the filamentary type and connected across a portion of the source. In a torpedo having both horizontal and vertical rudder steering control systems, all of the tubes, of course, may be supplied from a single source.

Although a specific embodiment of the invention has been shown and described, it will be understood that it is but illustrative and that various modifications may be made therein without departing from the scope and spirit of this invention as defined in the appended claims.

What is claimed is:

1. A signal controlled steering system for a moving body comprising a rudder, a pair of signal translating devices, means for converting the combined outputs of said devices into a signal having a component of a prescribed frequency and a phase corresponding to the greater of the outputs of the two devices, alternating current amplifier means, means for applying said component to the input of said amplifier means, auxiliary means for producing a signal of said prescribed frequency corresponding in amplitude and phase to a positional condition of said body, means for applying said last-mentioned signal to the input of said amplifier means, means for resolving the alternating current output of said amplifier means into a direct current control signal corresponding in polarity to the phase of the input of said amplifier means, means for deflecting said rudder in one direction or the other in accordance with the polarity of said control signal and means for rendering said auxiliary means inoperative when the outputs of said devices are of at least a predetermined magnitude.

2. A signal controlled steering system for a moving body comprising a rudder, a pair of signal translating devices, means for converting the combined outputs of said devices into a signal having a component of a prescribed frequency and of a phase corresponding to the greater of the outputs of the two devices, alternating current amplifier means, means for applying said component to the input of said amplifier means, additional means for producing a signal of said prescribed frequency corresponding in amplitude and phase to the magnitude and direction, respectively, to a positional condition of said body, means for applying said last-mentioned signal to the input of said amplifier means in combination with said component, means for resolving the alternating current output of said amplifier means into a direct current control signal corresponding in polarity to the phase of the input of said amplifier means and means for deflecting said rudder in one direction or the other in accordance with the polarity of said control signal.

3. A signal controlled steering system for a moving body comprising a rudder, a pair of alternating current signal translating devices, an alternating current amplifier, means for connecting said devices to said amplifier alternately at a prescribed frequency, means for resolving the output of said amplifier into a direct current signal having a component of said frequency and corresponding to a half wave portion of said output, a second alternating current amplifier, means for supplying said component to the input of said second amplifier, means for producing a second signal of said frequency proportional in magnitude and related in phase to the magnitude and direction, respectively, of the rudder deflection, means for applying said signal to the input of said amplifier, means for rectifying the output of the second amplifier on a time basis and in phase with the alternating connection of said device to the said first amplifier and means for deflecting said rudder in one direction or the other in accordance with the polarity of the rectified output of said second amplifier.

4. A signal controlled steering system for a moving body comprising a rudder, a pair of alternating current signal translating devices, an alternating current amplifier, means for connecting said devices to said amplifier alternately at a prescribed frequency, means for resolving the output of said amplifier into a direct current signal having a component of said frequency and corresponding to a half wave portion of said output, a second alternating current amplifier, means for supplying said component to the input of said second amplifier, means for rectifying the output of said second amplifier on a time basis and in phase with the alternate connection of said devices to said first amplifier, and means for deflecting said rudder in one direction or the other in accordance with the polarity of the rectified output of said second amplifier.

5. A signal controlled steering system for a moving body comprising a rudder, a pair of signal translating devices, an amplifier, switching means for connecting said devices to said amplifier in alternation, an oscillator for operating said switching means, means for rectifying the output of said amplifier, means for converting the rectified output into an alternating current signal corresponding in amplitude and polarity to the difference of the outputs of said devices, means for deflecting said rudder in one direction or the other in accordance with the polarity of a direct current signal applied thereto, and means for resolving said alternating current signal into a direct current signal applied to said deflecting means, said resolving means comprising a rectifying element connected to the input of said deflecting means and operated in phase with said switching means by said oscillator.

6. A wave translating system comprising a direct current responsive device operable in accordance with the polarity of the signal applied thereto, means for producing a first alternating current signal of a prescribed frequency, means for producing a second alternating current signal of a second frequency, means for resolving said first signal into a signal of said second frequency in time phase therewith and of amplitude proportional to said first signal, means for combining the resolved signal and said second signal in time phase, time controlled means for rectifying the combined signals at said second frequency, and means for applying the rectified signal to said direct current responsive device.

7. A signal controlled steering system for a moving body comprising a rudder, a pair of signal translating devices, an amplifier, means for operatively connecting said devices to the input of said amplifier in alternation at a prescribed frequency, a second amplifier having an input grid, means for rectifying the output of said first amplifier and applying the rectified signal to said grid, means for rectifying the output of said second amplifier in time phase with the alternate connection of said devices to said first amplifier, means for deflecting said rudder in accordance with the rectified output of said second amplifier, a potentiometer having its contact arm connected to said grid, means for moving said arm in accordance with a positional condition of said body, and means for energizing said potentiometer at said frequency and in phase with the alternate connection of said devices to said first amplifier.

8. A signal controlled steering system for a moving body comprising a rudder, an amplifier, an impedance in circuit with the input grid of said amplifier, signal translating means connected to said grid by way of said impedance, means for producing a signal proportional to a positional condition of said body, a resistance small in comparison to said impedance, a second resistance of comparable magnitude to said impedance, means for applying said signal to said grid by way of said resistances, means for short-circuiting said second resistance when the body reaches a predetermined position with respect to a reference point, and means for controlling said rudder in accordance with the output of said amplifier.

9. A steering system for a torpedo comprising a horizontal rudder, an amplifier, means for controlling said rudder in accordance with the output of said amplifier, said amplifier having an impedance in circuit with the input element thereof, signal translating means responsive to signals emanating from a submerged target, means connecting said translating means to said element by way of said impedance, a control signal producing means operable in accordance with a positional condition of said torpedo and connected to said element by a normally open series path including a resistance small in comparison to said impedance and a second resistance comparable in magnitude to said impedance, and means for short-circuiting said second resistance and closing said path whenever said torpedo is at less than a prescribed depth of submersion.

10. A steering system for a torpedo in accordance with claim 9 comprising a second normally closed path between said control signal producing means and said element including said resistance, and means for open circuiting said second path whenever the signal intensity at said signal translating means is of at least a prescribed level.

No references cited.

BENJAMIN A. BORCHELT, *Primary Examiner.*

FRED C. MATTERN, *Examiner.*